(12) United States Patent
Lawrence et al.

(10) Patent No.: US 9,120,682 B2
(45) Date of Patent: Sep. 1, 2015

(54) METHOD AND APPARATUS FOR GENERATING MERCURY (II) SULFIDE FROM ELEMENTAL MERCURY

(71) Applicant: BETHLEHEM APPARATUS COMPANY, INC., Hellertown, PA (US)

(72) Inventors: Bruce J. Lawrence, Hellertown, PA (US); Scott A. Schreffler, Bethlehem, PA (US)

(73) Assignee: BETHLEHEM APPARATUS COMPANY, INC., Hellertown, PA (US)

( * ) Notice: Subject to any disclaimer, the term of this patent is extended or adjusted under 35 U.S.C. 154(b) by 0 days.

(21) Appl. No.: 14/314,982

(22) Filed: Jun. 25, 2014

(65) Prior Publication Data

US 2014/0377163 A1 Dec. 25, 2014

Related U.S. Application Data

(60) Provisional application No. 61/839,245, filed on Jun. 25, 2013.

(51) Int. Cl.
*C01G 13/00* (2006.01)
*A62D 3/30* (2007.01)

(52) U.S. Cl.
CPC ..................... *C01G 13/00* (2013.01)

(58) Field of Classification Search
CPC ....... C01G 13/00; A62D 3/30; A62D 2101/00
See application file for complete search history.

(56) References Cited

U.S. PATENT DOCUMENTS

| | | |
|---|---|---|
| 5,268,152 A | 12/1993 | Delzer et al. |
| 5,298,227 A | 3/1994 | Hirth et al. |
| 6,053,187 A | 4/2000 | Altomonte |
| 6,156,281 A | 12/2000 | Akers et al. |
| 6,399,849 B1 | 6/2002 | Kalb et al. |
| 6,403,044 B1 | 6/2002 | Litz et al. |
| 6,579,507 B2 | 6/2003 | Pahlman et al. |
| 7,060,233 B1 | 6/2006 | Srinivas et al. |
| 7,691,361 B1 * | 4/2010 | Boyle et al. ............. 423/566.1 |
| 7,914,757 B1 * | 3/2011 | Bonmann .................. 423/210 |
| 2004/0219083 A1 | 11/2004 | Schofield |
| 2005/0089437 A1 | 4/2005 | Kano et al. |
| 2007/0180802 A1 | 8/2007 | Parker et al. |
| 2008/0019900 A1 | 1/2008 | Riviere-Huc et al. |

OTHER PUBLICATIONS

International Search Report and Written Opinion for corresponding International Application No. PCT/US08/80642, dated Dec. 24, 2008, pp. 1-11.
Science Applications International Corporation Engineering and Environmental Management Group, "Technical Background Document: Mercury Wastes Evaluation of Treatment of Bulk Elemental Mercury Final Report", dated Aug. 2, 2002, 379 Pages, Reston, Virginia, United States.

* cited by examiner

*Primary Examiner* — Timothy Vanoy
(74) *Attorney, Agent, or Firm* — Ditthavong & Steiner, P.C.

(57) ABSTRACT

An approach is provided for generating red mercury (II) sulfide from elemental mercury. Elemental mercury is combined with sulfur and heated until vaporized. At least a portion of the elemental mercury reacts with the vaporized sulfur to form the mercury (II) sulfide. Un-reacted elemental mercury is drawn off and condensed by a condenser.

20 Claims, 4 Drawing Sheets

METHOD AND APPARATUS FOR GENERATING MERCURY (II) SULFIDE FROM ELEMENTAL MERCURY

RELATED APPLICATION

This application claims the benefit of the earlier filing date under 35 U.S.C. §119(e) of U.S. Provisional Application Ser. No. 61/839,245 filed on Jun. 25, 2013, entitled "Method and Apparatus for Generating Mercury (II) Sulfide from Elemental Mercury," the entirety of which is incorporated herein by reference.

BACKGROUND OF THE INVENTION

The international community has imposed an increasing number of restrictions on the movement and commercial uses of mercury. For instance, some countries have adopted or are experimenting with adopting complete bans on the export of elemental mercury. Once adopted, a mercury ban is likely to have the effect of increasing the supply of elemental mercury beyond the demand for the substance within the affected region. As a result, countries adopting an export ban on elemental mercury could see growing surpluses of mercury.

As noted by the European Union and the United States during debates over their respective mercury regulations, a surplus of elemental mercury is particularly problematic because there is currently no viable long-term storage or disposal technique for elemental mercury. As such, surplus mercury is most commonly stored in its elemental form in iron flasks. These iron flasks are then warehoused and monitored to ensure their ongoing integrity. The long-term strength and durability of these iron flasks is, at least, debatable and, therefore, great concern over potential environmental hazards exists. In response, both the European Union and the United States have cited a need for the development of new technologies capable of converting elemental mercury into solid mercury compounds that are suitable for long-term storage and disposal.

Even in the absence of a mercury ban, some generators of elemental mercury would like to avoid being forced to sell their surplus mercury on the world market. Currently, the law in many jurisdictions (e.g., the United States) requires that all mercury must be sold or recycled. This requirement forces mercury generators to sell their mercury to avoid having to store the mercury indefinitely. The development of a viable mercury treatment option could give mercury generators an alternative to selling their mercury.

Therefore, there is a need for an approach capable of generating a stable solid compound of elemental mercury. A particular need exists for reaction processes capable of minimizing or eliminating the presence of elemental mercury residuals in the resulting mercury compound.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for generating mercury (II) sulfide from elemental mercury are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
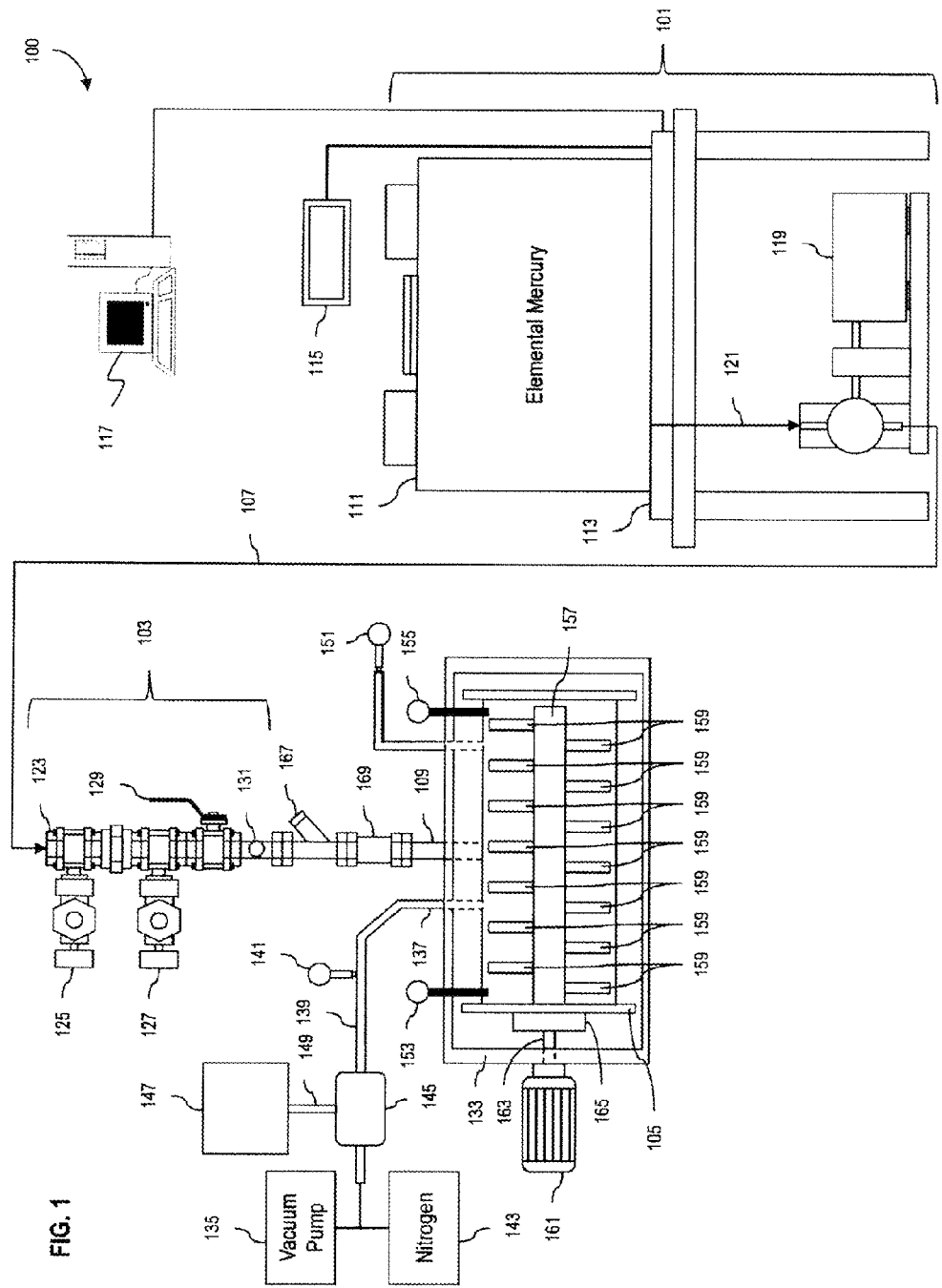
FIG. 1 is a schematic diagram of a system for generating mercury (II) sulfide from elemental mercury, according to an exemplary embodiment.

FIG. 1 is a schematic diagram of a system 100 for generating mercury (II) sulfide from elemental mercury, according to an exemplary embodiment. In this example, system 100 includes elemental mercury source 101, valve system 103, and reaction vessel 105. While specific reference will be made to these components and their individual parts and configurations, it is contemplated that system 100 may embody many forms and include multiple and/or alternative components and configurations.

According to one embodiment, system 100 utilizes reaction vessel 105 capable of maintaining sufficient reactive conditions (e.g., pressure, temperature, volume, etc.) for vaporizing and combining elemental mercury with sulfur. In exemplary embodiments, this process begins in a non-reactive environment at atmospheric pressure. It is noted that the vaporization of elemental mercury and sulfur facilitates a more complete reaction between the substances introduced to reaction vessel 105. Further, any un-reacted vaporized elemental mercury can be drawn off and condensed back to liquid form for storage and/or future reaction. As a consequence, system 100 is capable of, but is not limited to, generating mercury (II) sulfide containing no (or substantially no) detectable levels of residual elemental mercury.

Traditionally, mercury (II) sulfide generation technologies have relied on reacting elemental mercury with sulfur at relatively low temperatures (e.g., room temperature or slightly there above). These technologies, however, fail to completely purge residual elemental mercury from generated mercury (II) sulfide. Namely, the reaction between the source elemental mercury and the sulfur reagent is not complete. This occurs primarily because the elemental mercury divides into microscopic beads during physical agitation. The microscopic beads of mercury do not readily interact with the sulfur reagent to generate mercury (II) sulfide and, for the most part, remain un-reacted. Un-reacted elemental mercury results in significant amounts of detectable residual elemental mercury in the produced mercury (II) sulfide.

Furthermore, the approach of system 100, according to certain embodiments, stems from the recognition that reacting elemental mercury with sulfur under high temperature and pressure conditions, creates a more stable, less soluble form of mercury (II) sulfide (i.e., red mercury (II) sulfide, also known as cinnabar). It is noted that mercury (II) sulfide generally occurs in two crystalline forms: a hexagonal crystalline form known as red mercury (II) sulfide and a cubic tetrahedral crystalline form known as black mercury (II) sulfide. While both forms are considered inert and insoluble in water and in most acidic conditions, the water solubility of red mercury (II) sulfide (e.g., $K_{sp}=3.0\times10^{-53}$ $M^2$) is lower than the solubility for black mercury (II) sulfide (e.g., $K_{sp}=1.9\times10^{-15}$ $M^2$). Thus, red mercury (II) sulfide dissolves less readily than black mercury (II) sulfide under normal environmental conditions. Accordingly, system 100, in exemplary embodiments, is configured to produce red mercury (II) sulfide. In certain instances, the produced red mercury (II) sulfide is greater than 99.9% pure and is free (or substantially free) of detectable (or trace) amounts of residual elemental mercury.

As previously mentioned, governmental restrictions and regulations are driving the need for an approach capable of converting elemental mercury into stable, solid compounds that are suitable for long-term storage and disposal. For example, the U.S. Environmental Protection Agency (EPA) has historically favored regulations that promote the recycling and recovery of elemental mercury for commercial use over treatment and disposal of elemental mercury. However, EPA has come to recognize that as more regulations restrict the commercial uses of mercury, future commercial demand for mercury could become much less than the available supply. Continued recycling of elemental mercury under these circumstances could contribute to a growing worldwide surplus of elemental mercury. Therefore, EPA has acknowledged that the treatment and disposal of elemental mercury is a potential solution to the problem of surplus elemental mercury. As a result, EPA has developed regulations that approve of certain methods used in the processing of elemental mercury into a stable, solid compound of including mercury. In addition, many generators of elemental mercury would like to avoid selling mercury on the world market and need a viable option for treating their excess elemental mercury that takes advantage of the approved methods for processing elemental mercury.

Accordingly, various exemplary embodiments of system 100 stem from the need to convert surplus elemental mercury into a stable, solid compound that can be either disposed of or stored over long durations while minimizing the risk of potential environmental contamination.

As seen in FIG. 1, system 100 includes elemental mercury source 101 detachably coupled to valve system 103 via supply line 107 that, in exemplary embodiments, is pressurized for the delivery of relatively high pressure elemental mercury. Valve system 103 is, in turn, detachably coupled to reaction vessel 105 via inlet 109. According to certain embodiments, elemental mercury source 101 includes mercury supply container 111 having a predetermined elemental mercury storage capacity, such as 2,000 lbs of elemental mercury. It is contemplated, however, that any suitable storage capacity can be utilized. Supply container 111 stores elemental mercury for later reaction within reaction vessel 105 and can be mounted on, for instance, deck scale 113 including or coupled to digital readout 115. Deck scale 113 is used, in exemplary embodiments, to monitor the amount of elemental mercury processed by system 100. Namely, by performing continuous, periodic, or on-demand measurements of the weight of supply container 111 and the elemental mercury contained therein, system 100 can track the amount of elemental mercury introduced during a reaction process, such as the mercury (II) sulfide reaction process of FIG. 3. In other words, a change in weight indicates an amount of elemental mercury processed or being processed. In certain embodiments, deck scale 113 communicates with a control system 117, such as a computing device, to provide for automated monitoring and control of elemental mercury source 101. It is contemplated that the control system may communicate with deck scale 113 (or any another suitable component of system 100) over one or more communication networks, such as any suitable wired or wireless local area network (LAN), metropolitan area network (MAN), wide area network (WAN), etc. As such, system 100 can be configured for remote monitoring and/or controlling.

Elemental mercury source 101 also includes pump 119 coupled to supply container 111 via supply line 121. In exemplary embodiments, pump 119 is capable of pumping elemental mercury at relatively high pressures. As such, pump 119 can draw and pressurize elemental mercury from supply container 111 via supply line 121 and can deliver the pressurized elemental mercury to valve system 103 via supply line 107. Accordingly, supply lines 107 and 121 can be manufactured from materials (e.g., iron, iron alloy, steel, steel alloy, etc.) of sufficient strength to withstand the relatively high pressures generated when pumping elemental mercury from supply container 111 to valve system 103. It is contemplated that alternate means of feeding elemental mercury to valve system 103 or reaction vessel 105 (e.g., manual loading, gravity feed, etc.) may be used in lieu of, or in addition to, one or more of the components described above with respect to elemental mercury source 101.

According to exemplary embodiments, valve system 103 is detachably coupled to supply line 107 of elemental mercury source 101 through inlet 123. Inlet 123 provides an input to valve system 103 that includes valves 125 and 127, as well as shutoff valve 129. The valve system 103 directs the flow of elemental mercury (such as pressurized elemental mercury) from elemental mercury source 101 to reaction vessel 105 by opening and closing one or more of valves 125, 127, or 129 to either permit or block the flow of elemental mercury. Shutoff valve 129 is provided as a manual safety shutoff valve and can, therefore, block the flow of elemental mercury into valve system 103 even when valves 125 and 127 are in an open (or relatively open) position (or state). It is contemplated that alternate embodiments of valve system 103 may include only one valve or any number of valves to manage the flow of elemental mercury from elemental mercury source 101 to reaction vessel 105. In this manner, opening valves 125 and 127, as well as shutoff valve 129, enables elemental mercury to flow from elemental mercury source 101 to reaction vessel 105. Valve system 103 enables elemental mercury to flow in only one direction, i.e., from inlet 123 to reaction vessel 105, by the inclusion of ball check valve 131. That is, any pressure from a backflow of mercury forces the ball of ball check valve 131 against an outlet of the shutoff valve 129 and, thereby, closes off the pathway to potential reverse flows of elemental mercury.

Valve system 103 is detachably coupled to reaction vessel 105 via inlet 109. Reaction vessel 105 can be surrounded by insulation jacket 133 that contains one or more heating elements for heating reaction vessel 105 to an appropriate reaction temperature. According to particular embodiments, the heating element(s) are capable of heating reagents within reaction vessel 105 to temperatures of about 361.1° C. (or 650° F.). In certain embodiments, insulation jacket 133 also includes one or more active cooling elements for quickly cooling reaction vessel 105 from reaction temperatures to, for instance, room temperature, such as after red mercury (II) sulfide has been produced via system 100. Active cooling enables system 100 to be capable of processing more elemental mercury in a given time period by shortening a period of time for cooling reaction vessel 105 between processing cycles.

In exemplary embodiments, a vacuum state is created within reaction vessel 105 at the beginning of reaction processes prior to heating reaction vessel 105. To help create this initial vacuum state, a vacuum pump 135 can interface with reaction vessel 105 via, for instance, inlet 137 at reaction vessel 105 of vacuum line 139. Vacuum line 139 can be manufactured from materials (e.g., iron, iron alloy, steel, steel alloy, etc.) of sufficient strength to withstand the vacuum generated by vacuum pump 135. Vacuum line 139 may include vacuum pressure gauge 141 (such as a mechanical or electrical vacuum pressure gauge) for monitoring a level of vacuum generated by vacuum pump 135. In certain embodiments, vacuum pressure gauge 141 communicates with control system 117. Vacuum pump 135, in exemplary embodiments, creates a vacuum level of greater than about 25 inHg within reaction vessel 105. In addition, vacuum pump 135 may be attached to a source of a compressed gas that does not react with either elemental mercury or sulfur (e.g., nitrogen gas source 143) to enable vacuum pump 135 to back fill reaction vessel 105 with the gas before achieving a target vacuum level. This backfilling purges reaction vessel 105 of reactive gases that could potentially interfere with reaction processes (e.g., purging oxygen from reaction vessel 105 to minimize oxidation of elemental mercury and/or sulfur during reaction processes). It is noted, however, that the reaction of elemental mercury with sulfur may nonetheless proceed without this backfilling procedure. Therefore, certain embodiments do not include a source of non-reactive compressed gas (e.g., nitrogen gas source 143) for backfilling reaction vessel 105.

Between the vacuum pump 135 and insulation jacket 133 along vacuum line is chilled condenser 145. Chilled condenser 145 may be any type of condenser that can operate at the conditions within reaction vessel 105 to condense unreacted elemental mercury vapor drawn from reaction vessel 105 to liquid form. Un-reacted, vaporized elemental mercury is drawn from reaction vessel 105 and condensed at chilled condenser 145 back into liquid form. The condensed, liquid elemental mercury is then collected in condensing chamber 147 through condensate line 149. However, in certain embodiments, the condensed, liquid elemental mercury instead may be collected within the supply container 111 or other container. By including the chilled condenser 145, the system 100 qualifies as a retort under approved methods of treatment by EPA regulations. Further, drawing off un-reacted elemental mercury by chilled condenser 145 allows for the production of greater than 99.9% pure red mercury (II) sulfide that is free (or substantially free) of detectable (or trace) amounts of residual elemental mercury.

Reaction vessel 105 can also include, for example, pressure gauge 151 (e.g., mechanical or electrical pressure gauge) and temperature gauges 153 and 155 to monitor one or more reaction conditions of reaction vessel 105. In certain exemplary embodiments, one or more of these gauges 151, 153, and 155 communicate with control system 117 so as to enable automated monitoring and controlling of mercury (II) sulfide generation processes. However, in other embodiment, one or more of these gauges 151, 153, and 155 may not be included with reaction vessel 105.

In various embodiments, reaction vessel 105 may be a stainless steel cylindrical container measuring, for instance, substantially 24 inches in length and substantially 12 inches in diameter. A vessel of such dimensions can process approximately 400 to 500 lbs of elemental mercury per reaction process (or batch). It is contemplated that reaction vessel 105 can be alternatively sized, scaled up, or scaled down depending on an anticipated amount of elemental mercury to be processed in any given batch. According to one embodiment, reaction vessel 105 includes ¼-inch thick stainless steel side wall, 1-inch thick top plate, and 1½-inch thick bottom plate.

It is noted that the dimensioning of reaction vessel 105 may be suitably modified, such as modified to accommodate reaction conditions (e.g., pressure, temperature, volume, etc.) of reaction vessel 105. One or more flanges (not shown for illustrative convenience) may surround openings in reaction vessel 105 to accommodate, for example, inlet 109, inlet 137, and gauges 151, 153 and 155. However, inlet 109, for example, may be formed as part of side wall of reaction vessel 105 such that no flange is required. The details of reaction vessel 105 are exemplary, and it is contemplated that any equivalent specifications or construction of reaction vessel 105 may be used provided the vessel is sufficiently robust to withstand the reactive conditions (e.g., pressure, temperature, volume, etc.) generated during mercury (II) sulfide generation. Reaction vessel 105 also can be constructed of any suitable material that does not readily react with either elemental mercury or sulfur.

Reaction vessel 105 also includes shaft 157 that extends down the center from one plate (e.g., end) of reaction vessel 105 to the opposite plate (e.g., end), such as from bottom plate towards top plate. In various embodiments, the reaction vessel 105 is configured with one or more mixing systems to act on the reactants (e.g., elemental mercury or sulfur) introduced into the reaction vessel 105. As shown in FIG. 1, one example of a mixing system is a paddle system comprising a shaft 157 which may be attached at both plates or at only one plate to reaction vessel 105. Attached to and extending radially outward from shaft 157 are paddles 159. Although illustrated as extending from shaft 157 in an alternating sides pattern, paddles 159 may extend from shaft 157 according to any pattern, such as each paddle 159 extending at a 90 degree angle from shaft 157 as compared to a previous paddle 159. Further, paddles 159 may have various shapes and configurations, and all paddles 159 may have the same shape or have various different shapes. Although not shown (for illustrative convenience), the reaction vessel 105 may also include baffles extending radially inward from the inner surface of reaction vessel 105 that cooperate with paddles 159 in mixing the elemental mercury and sulfur within reaction vessel 105.

Another example of a mixing system is a ribbon style blender (not illustrated) that can be configured in place of the example paddle 159 assembly described above. In one embodiment, the ribbon style blender is constructed in such a way as to move the outer material (e.g., reactants and/or product) laterally in one direction while an inner ribbon moves the material laterally in the opposite direction. The example paddle 159 assembly and the ribbon style blender assembly are provided for illustration and are not intended as limitations. Accordingly, it is contemplated that any equivalent agitator or mixing system may be used according to the various embodiments of the reaction vessel 105 described herein.

In one embodiment, motor 161 in cooperation with drive shaft 163 is detachably coupled to the mixing system (e.g., to shaft 157 of reaction vessel 105 at a couple point surrounded by seal 165). Motor 161 is designed with enough power to rotate shaft 157 and paddles 159 to mix elemental mercury and sulfur during reaction, such as at three to ten rotations per minute (rpm), or higher based on a desired degree of mixing. Seal 165 is designed to withstand high reaction conditions (e.g., temperatures and pressures) within reaction vessel 105 during formation of red mercury (II) sulfide.

Although the elemental mercury source 101 and valve system 103 are discussed with respect to inputting elemental mercury into reaction vessel 105, it is also contemplated that a second source and valve system may be provided for controlled delivery of sulfur to reaction vessel 105. For example, second source and valve system for controlled delivery of sulfur to reaction vessel 105 may be attached to threaded connection 167 for delivery of sulfur to reaction vessel 105 through inlet 109. Further, it is contemplated that the second source and valve system may communicate with control system 117 so as to enable automated monitoring and/or controlling of delivery of sulfur to reaction vessel 105 for system 100. Further, in certain embodiments, system 100 may include sight glass 169 in communication with inlet 109. Sight glass 169 allows for a visual indication of delivery of elemental mercury and/or sulfur into reaction vessel 105.

Figure 2:
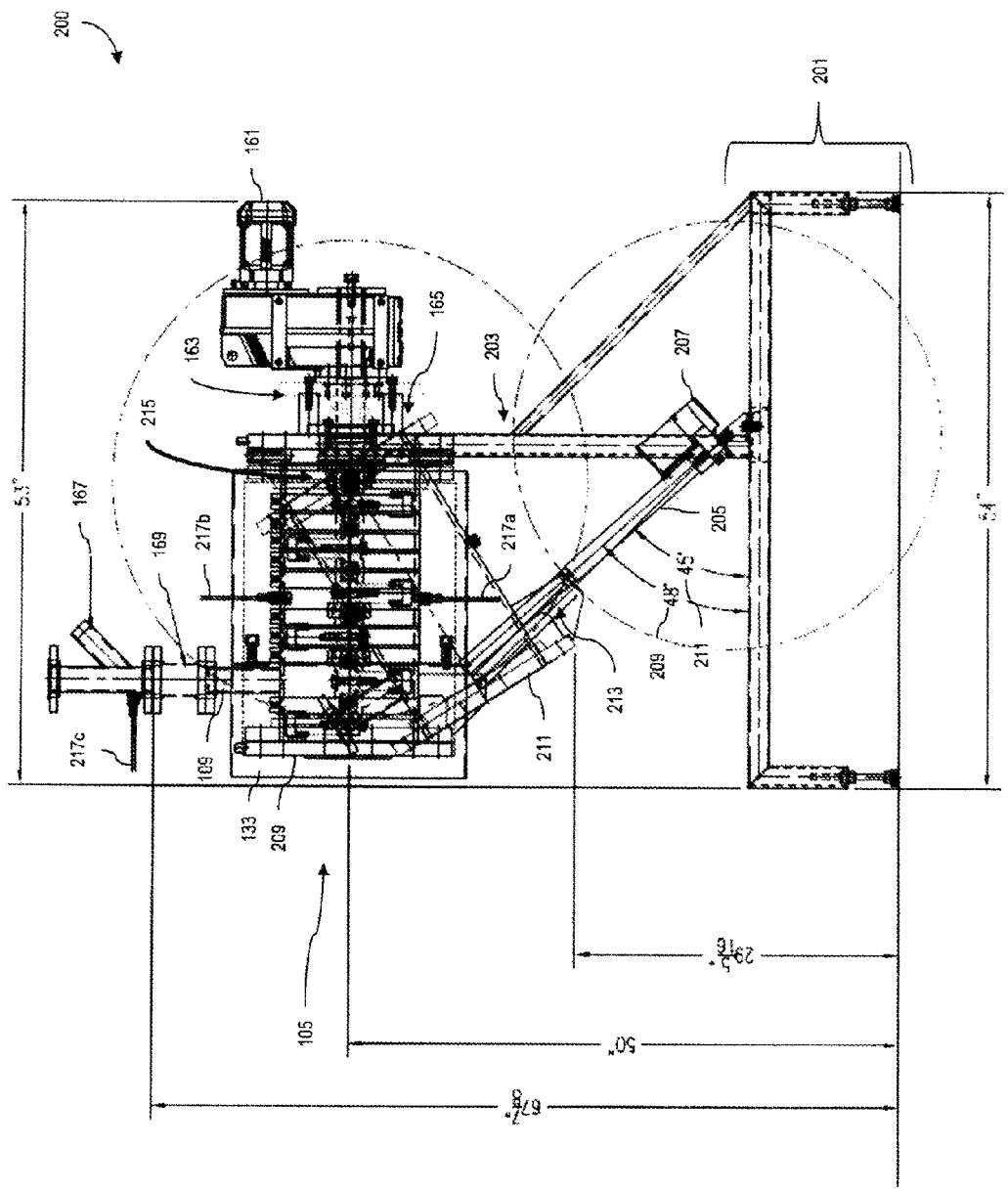
FIG. 2 is a detailed schematic diagram of a reaction vessel system, according to an exemplary embodiment.

FIG. 2 is a detailed schematic diagram of reaction vessel system 200, according to an exemplary embodiment. Although FIG. 2 illustrates dimensions of various components of reaction vessel system 200, the dimensions are merely exemplary and can vary between embodiments reaction vessel system 200. Reaction vessel system 200 includes reaction vessel 105 illustrated in FIG. 1 connected to stand 201. Stand 201 includes support arm 203 and pivot art 205. Pivot arm 205 is connected to actuator 207 that actuates pivot arm 205 between position 209 and position 211. At position 209, pivot arm 205 forms, for example, a 48 degree angle to base of stand 201. At position 211, pivot arm 205 forms, for example, a 45 degree angle to base of stand 201. Pivot arm 205 may also include piston 213 that extends and retracts based on, for example, whether pivot arm 205 is in position 209 or position 211. Actuating from position 209 to position 211 may allow for removal of red mercury (II) sulfide from inside of reaction vessel 105 upon completion of reaction processes. In one embodiment, the end of reaction vessel 105 that moves from position 209 to 211 may include the ability to open for removal of the red mercury (II) sulfide. In one embodiment, reaction vessel 105 may include a pivot point 215 at the end where shaft 157 couples to drive shaft 163 to allow reaction vessel 105 to pivot between position 209 and 211 while shaft 157 and drive shaft 163 remain coupled. Alternatively, pivot point 215 may connect the end of reaction vessel 105 to support arm 203 and allow reaction vessel 105 to pivot with respect to support arm 203 between position 209 and position 211. In yet other alternative embodiments, the reaction vessel 105 may be configured with a door (not illustrated) that can be removed following completion of the reactive process. By way of example, a coupling can be added to the door so that the mixing system (e.g., the paddle 159 or the ribbon style blender system discussed above) can be run to that mercury (II) sulfide resulting from the reactive process is pushed out of the reaction vessel 105 and into a receiving system (not illustrated) where it can be transferred to a storage container (not illustrated).

In certain embodiments, reaction vessel 105 may include one or more inlets 217a, 217b, and 217c. For example, inlet 217c may correspond to a connection of vacuum line 139 to reaction vessel 105 rather than inlet 137 illustrated in FIG. 1. Alternatively, inlet 217a or 217b may correspond to inlet 137 of FIG. 1 that allows vacuum line 139 to directly connect to reaction vessel 105 (rather than going through inlet 109). In other embodiments, inlet 217a may correspond to inlet 137 for vacuum line 139 and inlet 217b may correspond to a separate connection for chilled condenser 145 to reaction vessel 105.

Figure 3:
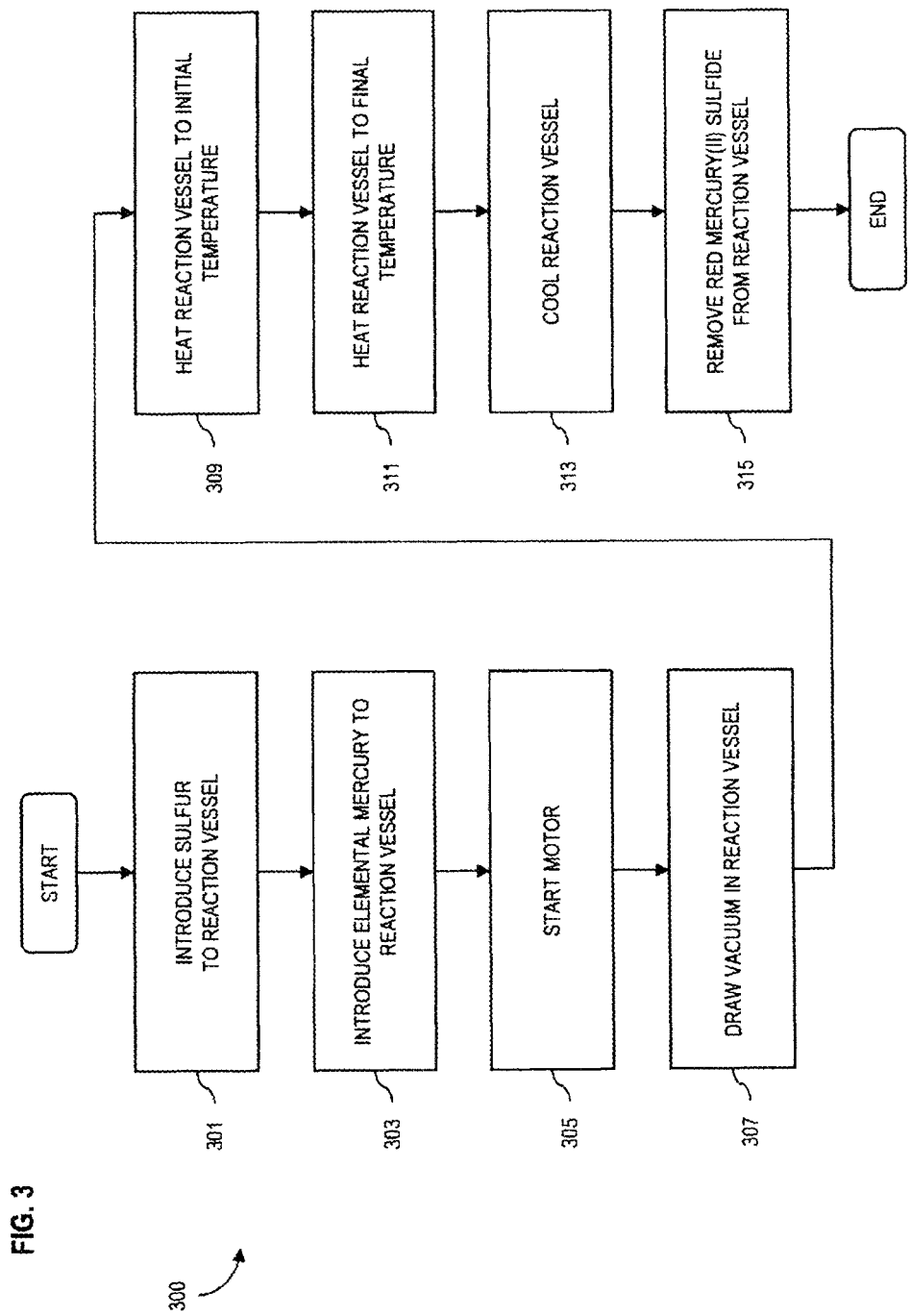
FIG. 3 is a flowchart of a process for generating mercury (II) sulfide from elemental mercury, according to an exemplary embodiment.

FIG. 3 is a flowchart of a process for generating red mercury (II) sulfide from elemental mercury, according to an exemplary embodiment. For illustrative purposes, process 300 is described with respect to FIG. 1. It is noted that the steps of process 300 may be performed in any suitable order, as well as combined or separated in any suitable manner Further, process 300 may be monitored and/or controlled via control system 117, which may communicate other components within system 100 via one or more communication networks.

Process 300 begins with the addition of, for instance, pure reagent-grade sulfur to reaction vessel 105 (step 301). It is noted that when the sulfur is introduced to reaction vessel 105, reaction vessel 105 is, in exemplary embodiments, substantially clean and at substantially room temperature at, for instance, atmospheric pressure. The sulfur may be delivered via the aforementioned second source and the valve system under control of, for instance, the aforementioned control system 117. An amount of sulfur added to reaction vessel 105 is slightly less than the amount stoichiometrically needed to fully react with an amount of elemental mercury to be processed. It is noted that by using an amount of sulfur that is slightly less than stoichiometrically needed can reduce the amount of excess sulfur used during process 300. For example, if 400 lbs of elemental mercury are to be processed, approximately 60 lbs to 63 lbs of sulfur can be added to reaction vessel 105 at step 301.

After adding an appropriate amount of sulfur, elemental mercury is added to reaction vessel 105 (step 303). It is noted that when the elemental mercury is introduced to reaction vessel 105, reaction vessel 105 is, in exemplary embodiments, at substantially room temperature at, for instance, atmospheric pressure. The elemental mercury may be delivered via the aforementioned elemental mercury source 101 and valve system 103 under control of, for instance, the aforementioned control system 117. An amount of elemental mercury added to reaction vessel 105 is slightly more than the amount stoichiometrically needed to fully react with an amount of sulfur to be processed. It is noted that by using an amount of elemental mercury that is slightly more than stoichiometrically needed can reduce the amount of excess sulfur used during process 300. Further, as discussed below, any remaining elemental mercury can be drawn from reaction vessel 105 in vapor form and condensed at chilled condenser 145 back to liquid form into condensing chamber 147. Upon delivery of elemental mercury to reaction vessel 105, one or more of valves 125, 127, and 129 can be arranged in a closed position (or state) to ensure a proper seal of reaction vessel 105.

After adding the elemental mercury and sulfur into reaction vessel 105, motor 161 is started (step 305). Motor 161 turns shaft 157 and paddles 159 to agitate the elemental mercury and sulfur within reaction vessel 105. Motor 161 may operate to turn shaft 157 and paddles 159 at, for example, three to ten rpm. Prior to or after motor 161 is turned on, vacuum line 139 is connected to reaction vessel 105 to draw a vacuum within the reaction vessel (step 307). Vacuum pump 135 can be actuated to create a vacuum within reaction vessel 105 at, for instance, a level greater than 25 inHg. In exemplary embodiments, with reaction vessel 105 sealed, any gas (e.g., air) in reaction vessel 105 can be removed and, thereby, replaced by a non-reactive atmosphere (e.g., nitrogen) from nitrogen gas source 143 prior to drawing the vacuum. Vacuum pump 135 can then backfill reaction vessel 105 with a non-reactive gas before achieving a final vacuum level. According to one embodiment, the non-reactive gas is nitrogen. It is contemplated, however, that any suitable gas (e.g., argon, etc.) that does not react with either elemental mercury or sulfur may be used to create a non-reactive atmosphere in reaction vessel 105.

In step 309, one or more electric heating elements of insulation jacket 133 can be actuated to heat reaction vessel 105 to an initial temperature. In certain embodiments, the initial temperature may be between 65 and 205° C., such as 166.67°

C. (or 300° F.). The one or more electric heating elements gradually heat reaction vessel to the initial temperature, such as by increasing the temperature by 1.2° C. every minute. Reaction vessel 105 is, in exemplary embodiments, heated to a temperature sufficient to melt the sulfur so that within reaction vessel 105 is hot sulfur in a liquid state and hot mercury in a liquid state. At this temperature, there may also be some mercury vapor present within reaction vessel 105 but not enough to force the mercury vapor out to vacuum pump 135. The one or more heating elements can be used to maintain reaction vessel 105 at the appropriate initial temperature. The reaction vessel 105 is maintained at the initial temperature for 15 to 120 minutes.

After initially heating the elemental mercury and sulfur in reaction vessel 105, the one or more electric heating elements of insulation jacket 133 are actuated to heat reaction vessel 105 to a final reaction temperature (step 311). Reaction vessel 105 is heated to a final reaction temperature between 315 and 538° C., such as 361.1° C. (or 650° F.), to vaporize the elemental mercury and sulfur and cause a reaction to form red mercury (II) sulfide. According to one embodiment, the temperature of reaction vessel 105 is below the sublimation point of red mercury (II) sulfide. As a result, the red mercury (II) sulfide generated during process 300 can crystallize (such as immediately or after a duration of time) and deposit in reaction vessel 105. Further, at this temperature, any black mercury (II) sulfide that is formed is converted into red mercury (II) sulfide. During formation of the red mercury (II) sulfide, un-reacted elemental mercury vapor is drawn off to the chilled condenser 145. At chilled condenser 145, the elemental mercury vapor is condensed back to liquid form and collected in condensing chamber 147. By condensing un-reacted elemental mercury vapor, system 100 qualifies as a retort and satisfies certain regulations regarding the processing and/or disposal of mercury, such as EPA regulations. For example, drawing off un-reacted elemental mercury by chilled condenser 145 allows for the production of greater than 99.9% pure red mercury (II) sulfide that is free (or substantially free) of detectable (or trace) amounts of residual elemental mercury while also fully reacting the original sulfur.

After a desired amount of elemental mercury and sulfur are processed, and un-reacted elemental mercury vapor is condensed by chilled condenser 145, reaction vessel 105 is cooled to enable safe unloading of the mercury (II) sulfide (step 313). According to certain embodiments, an active cooling system, such as one or more cooling elements of insulation jacket 133, can rapidly cool reaction vessel 105. Reaction vessel 105 can also be cooled by simply turning off the one or more heating elements of insulation jacket 133 and allowing reaction vessel 105 to cool through natural ambient heat transfer. Once reaction vessel 105 is cooled, the red mercury (II) sulfide generated within reaction vessel 105 can be removed (step 315). In certain instances, process 300 produces crusty layers of mercury (II) sulfide in reaction vessel 105 and, therefore, should also be removed.

Figure 4:
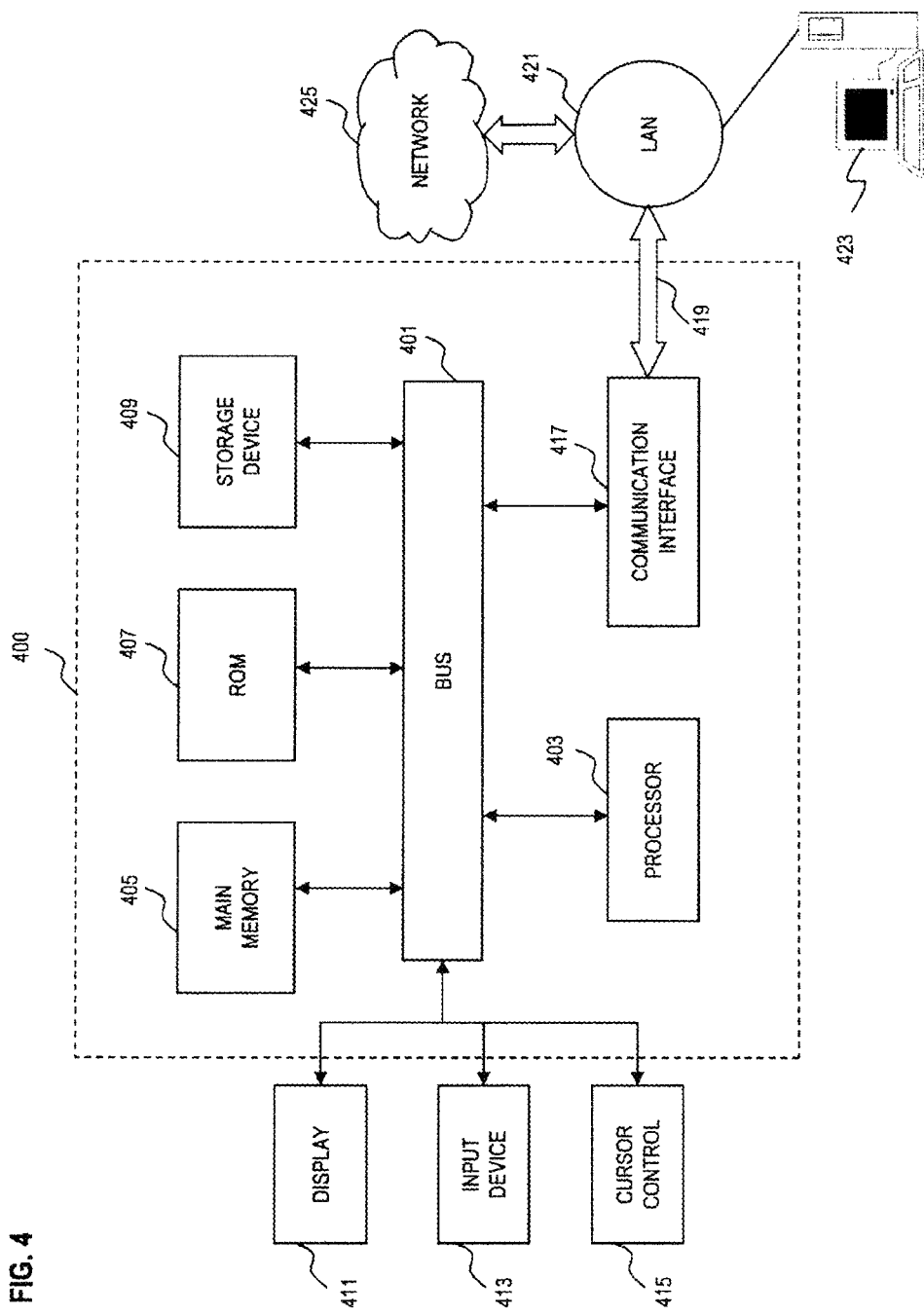
FIG. 4 is a diagram of a computer system that can be used to implement various exemplary embodiments of the process control system.

FIG. 4 is a diagram of a computer system that can be used to implement various exemplary embodiments of control system 117. The computer system 400 includes bus 401 or other communication mechanism for communicating information and processor 403 coupled to bus 401 for processing information. Computer system 400 also includes main memory 405, such as random access memory (RAM) or other dynamic storage device, coupled to bus 401 for storing information and instructions to be executed by processor 403. Main memory 405 also can be used for storing temporary variables or other intermediate information during execution of instructions by processor 403. Computer system 400 may further include read only memory (ROM) 407 or other static storage device coupled to bus 401 for storing static information and instructions for processor 403. Storage device 409, such as a magnetic disk or optical disk, is coupled to bus 401 for persistently storing information and instructions.

Computer system 400 may be coupled via bus 401 to display 411, such as a cathode ray tube (CRT), liquid crystal display, active matrix display, or plasma display, for displaying information to a computer user. Input device 413, such as a keyboard including alphanumeric and other keys, is coupled to bus 401 for communicating information and command selections to processor 403. Another type of user input device is cursor control 415, such as a mouse, a trackball, or cursor direction keys, for communicating direction information and command selections to processor 403 and for controlling cursor movement on display 411.

According to an embodiment of the invention, the processes described herein are performed by computer system 400, in response to processor 403 executing an arrangement of instructions contained in main memory 405. Such instructions can be read into main memory 405 from another computer-readable medium, such as storage device 409. Execution of the arrangement of instructions contained in main memory 405 causes processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the invention. Thus, embodiments of the invention are not limited to any specific combination of hardware circuitry and software.

Computer system 400 also includes communication interface 417 coupled to bus 401. Communication interface 417 provides a two-way data communication coupling to network link 419 connected to local network 421. For example, communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, network link 419 may provide a connection through local network 421 to host computer 423, which has connectivity to network 425 (e.g. a wide area network (WAN) or the global packet data communication network now commonly referred to as the "Internet") or to data equipment operated by a service provider. Local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

Computer system 400 can send messages and receive data, including program code, through the network(s), network link 419, and communication interface 417. In the Internet example, a server (not shown) might transmit requested code belonging to an application program for implementing an embodiment of the invention through network 425, local network 421 and communication interface 417. Processor 403 may execute the transmitted code while being received and/or store the code in storage device 409, or other non-volatile storage for later execution. In this manner, computer system 400 may obtain application code in the form of a carrier wave.

The term "computer-readable medium" as used herein refers to any medium that participates in providing instructions to processor 403 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus comprising:
a valve system configured for introduction of elemental mercury and sulfur into a reaction vessel;
the reaction vessel configured with a mixing system for mixing the elemental mercury and the sulfur to form mercury (II) sulfide, a vacuum system for creating a vacuum within the reaction vessel under seal, and a heating system for heating the reaction vessel to an initial temperature; and
an outlet from the reaction vessel configured for removing mercury (II) sulfide resulting from a reaction of the elemental mercury and the sulfur in the reaction vessel, and for removing an unreacted portion of the elemental mercury.

2. An apparatus of claim 1, wherein the reaction vessel is at a substantially room temperature and at a substantially atmospheric pressure on the introduction of the elemental mercury and the sulfur.

3. An apparatus of claim 1, wherein the heating system of the reaction vessel heats the reaction vessel from the initial temperature to a final temperature.

4. An apparatus of claim 3, wherein the initial temperature is above a melting point of the sulfur and below a boiling point of the elemental mercury, and wherein the final temperature is below a sublimation point of the mercury (II) sulfide.

5. An apparatus of claim 1, wherein the mixing system includes a ribbon style blender system, a paddle system, or a combination thereof.

6. An apparatus of claim 1, further comprising:
a condenser configured to draw off the unreacted portion of the elemental mercury, and to condense the unreacted portion.

7. An apparatus of claim 1, further comprising:
a cooling system configured to cool the reaction vessel for an unloading of the mercury (II) sulfide,
wherein the cooling system is a passive cooling system, an active cooling system, or a combination thereof.

8. An apparatus of claim 1, wherein the vacuum system is configured to replace a gas within the reaction vessel with a non-reactive gas.

9. An apparatus of claim 1, wherein the mixing system is configured to mix the elemental mercury and the sulfur at a predetermined rate.

10. A method comprising:
introducing elemental mercury and sulfur into a reaction vessel;
mixing the elemental mercury and the sulfur in the reaction vessel to initiate a reaction of the elemental mercury and the sulfur to form mercury (II) sulfide, wherein the reaction vessel is under a vacuum and heated to an initial temperature;
removing the mercury (II) sulfide via an outlet of the reaction vessel; and
drawing off an unreacted portion of the elemental mercury from the reaction vessel.

11. A method of claim 10, wherein the reaction vessel is at a substantially room temperature and at a substantially atmospheric pressure on introducing the elemental mercury and the sulfur.

12. A method of claim 10, further comprising:
heating the reaction vessel from the initial temperature to a final temperature during the reaction.

13. A method of claim 12, wherein the initial temperature is above a melting point of the sulfur and below a boiling point of the elemental mercury, and wherein the final temperature is below a sublimation point of the mercury (II) sulfide.

14. A method of claim 10, further comprising:
using a ribbon style blender system, a paddle system, or a combination thereof to mix the elemental mercury and the sulfur in the reaction vessel.

15. A method of claim 10, further comprising:
condensing the unreacted portion of the elemental mercury.

16. A method of claim 10, further comprising:
cooling the reaction vessel for an unloading of the mercury (II) sulfide using a passive cooling system, an active cooling system, or a combination thereof.

17. A method of claim 10, further comprising: replacing a gas within the reaction vessel with a non-reactive gas during the reaction.

18. A method of claim 10, further comprising: mixing the elemental mercury and the sulfur at a predetermined rate.

19. A system comprising:
a reaction vessel;
a first source of elemental mercury;
a second source of sulfur; and
a control system,
wherein the control system is configured to initiate at least one of:
an introduction of the elemental mercury and the sulfur into the reaction vessel;
a mixing of the elemental mercury and the sulfur in the reaction vessel to initiate a reaction of the elemental mercury and the sulfur to form mercury (II) sulfide, wherein the reaction vessel is under a vacuum and heated to an initial temperature; and a removal of the mercury (II) sulfide and a portion of unreacted elemental mercury via an outlet of the reaction vessel.

20. A system of claim 1, wherein the reaction vessel is at a substantially room temperature and at a substantially atmospheric pressure on the introduction of the elemental mercury and the sulfur.

* * * * *